United States Patent
Pich et al.

(10) Patent No.: US 9,328,599 B2
(45) Date of Patent: *May 3, 2016

(54) CENTRE FOR THE PREPARATION OF ADDITIVES FOR HYDRAULIC FRACTURING OPERATIONS AND HYDRAULIC FRACTURING PROCESS EMPLOYING THE PREPARATION CENTRE

(71) Applicants: Rene Pich, Saint Etienne (FR); Peter Nichols, Savannah, GA (US)

(72) Inventors: Rene Pich, Saint Etienne (FR); Peter Nichols, Savannah, GA (US)

(73) Assignee: S.P.C.M. SA (FR)

( * ) Notice: Subject to any disclaimer, the term of this patent is extended or adjusted under 35 U.S.C. 154(b) by 300 days.

This patent is subject to a terminal disclaimer.

(21) Appl. No.: 13/951,236

(22) Filed: Jul. 25, 2013

(65) Prior Publication Data

US 2014/0054042 A1 Feb. 27, 2014

Related U.S. Application Data

(60) Provisional application No. 61/693,547, filed on Aug. 27, 2012.

(51) Int. Cl.
| | |
|---|---|
| *B02C 23/18* | (2006.01) |
| *E21B 43/26* | (2006.01) |

(Continued)

(52) U.S. Cl.
CPC ............... *E21B 43/26* (2013.01); *B01F 3/1207* (2013.01); *B01F 3/1228* (2013.01); *B01F 3/1271* (2013.01); *B01F 7/16* (2013.01); *B01F 13/103* (2013.01); *B02C 23/18* (2013.01); *B02C 23/40* (2013.01); *C09K 8/62* (2013.01); *E21B 21/062* (2013.01); *E21B 43/267* (2013.01); *B02C 23/00* (2013.01)

(58) Field of Classification Search
CPC ........ B02C 23/00; B02C 23/18; B02C 23/40; B02C 23/26; B02C 23/28; E21B 43/26; B01F 7/16; B01F 3/1207; B01F 3/1271; B01F 13/103
USPC ...................................... 241/38, 60, 62, 101.2
See application file for complete search history.

(56) References Cited

U.S. PATENT DOCUMENTS

| 8,186,871 B2 | 5/2012 | Pich et al. |
| 2004/0136262 A1* | 7/2004 | Wilson .................. B01F 3/1221 366/163.2 |

(Continued)

FOREIGN PATENT DOCUMENTS

| WO | 2010010698 A1 | 1/2010 |
| WO | 2010020698 A2 | 2/2010 |

*Primary Examiner* — Faye Francis
(74) *Attorney, Agent, or Firm* — St. Onge Steward Johnston & Reens, LLC

(57) ABSTRACT

Compact and transportable preparation center which can be used for fracturing operations on gas or oil fields, capable of metering out and dissolving two different polymers in the powder form, and including: two pneumatic mechanisms respectively supplying two storage hoppers for two separate polymers; two mechanisms for supplying and metering the polymer originating respectively from the two storage hoppers to a device for dispersing by grinding, also denoted PSU; two series of tanks for hydration and dissolution of the polymers connected to the dispersing and grinding device; two positive displacement vacuum pumps for metering the two solutions each originating from the two series of hydration and dissolution tanks and intended to supply a mixer itself connected to a high-pressure injection pump. Fracturing process employing the preparation center.

5 Claims, 2 Drawing Sheets

(51) Int. Cl.
*C09K 8/62* (2006.01)
*B02C 23/40* (2006.01)
*E21B 43/267* (2006.01)
*E21B 21/06* (2006.01)
*B01F 7/16* (2006.01)
*B01F 13/10* (2006.01)
*B01F 3/12* (2006.01)
*B02C 23/00* (2006.01)

(56) References Cited

U.S. PATENT DOCUMENTS

2004/0218463 A1\* 11/2004 Allen ................... B01F 3/1221
366/164.6
2004/0256106 A1\* 12/2004 Phillippi ............... B01F 3/1221
166/308.2
2006/0176771 A1\* 8/2006 Adams ............... B01F 7/00633
366/270

\* cited by examiner

CENTRE FOR THE PREPARATION OF ADDITIVES FOR HYDRAULIC FRACTURING OPERATIONS AND HYDRAULIC FRACTURING PROCESS EMPLOYING THE PREPARATION CENTRE

BACKGROUND OF THE INVENTION

Hydraulic fracturing operations have increased, first in the United States of America and then in Canada, and will be expanded into countries such as China, Poland, Germany and England.

These operations, over the years, have become increasingly complex, being applied to increasingly lengthy horizontal drillings, so as to increase the production per well.

In principle, it consists in fracturing the in-place rock by injections of water at very high pressure (200 to 600 bar), in blocking the fractures by the injection of a propping agent, such as, for example, sand or ceramic, and in extracting the gas or oil therefrom.

Additives have been developed in order to make possible these fracturing operations in a safe and efficient manner.

Mention may be made, among these additives, of:

Friction reducers, which make it possible to obtain a pressure at the well bottom with lower injection pressures and lower pumping powers. These are polyacrylamides (PAMs), in the majority of cases in the conventional form, of emulsions. However, today, demand is focusing on powdered polyacrylamides and the Applicant Company has developed various materials which allow them to be efficiently employed on field.

Viscosifying agents, which are used to hold the sand in suspension and which are in the majority of cases guar gums. However, in the face of the shortage of guar, some other products have been used or are in the course of development: xanthan gums, polyacrylamide, and the like. Guar gums by nature are difficult to employ on field, because of their tendency to form agglomerates on contact with water which are very difficult and very time-consuming to dissolve. Conventionally, guar gums are suspended in a hydrocarbon and subsequently transported to fields, where they are dissolved in the injected water.

Crosslinking agents, such as borates, zirconates or titanates, which are used to crosslink guar gum so as to increase its viscosity and to prevent the sedimentation of the sand at a low pumping rate or during a shutdown.

The most important ingredients by volume are guar gum and polyacrylamide, which both exhibit dissolution difficulties.

This problem can be solved with the use of a dissolution unit referred to as "PSU" (Polymer Slicing Unit) described in Patent U.S. Pat. No. 8,168,871.

Subsequently, the Applicant Company described a mobile system for dissolving polyacrylamides in a large amount in Application WO 2010/010698, taking into account sizes and weights allowed between two fracturing operations.

Although the items of equipment mentioned above are effective, they do not take into account the following issue increasingly encountered by gas and oil operators.

One of the problems encountered in hydraulic fracturing operations today is the complexity of the management of the streams of the different products injected and the consequence with regard to the profitability of such operations. Various items of equipment are used to transport, dissolve, meter out and inject these products into the mixer which supplies the very-high-pressure injection pump. These items of equipment are often disparate and have to be connected separately to the control centre which decides dosages as a function of the fracturing parameters measured. One of the objectives is thus to reduce and concentrate as much as possible the items of equipment necessary.

Another issue is that today guar gum is suspended in a hydrocarbon using surfactants in order to be transported on field in liquid form and dissolved by mixing with water with vigorous stirring. This operation results in the use of ingredients which will subsequently be additional contaminants in the water treatment. The dispersion and dissolution in-place is thus a major advance in fracturing operations.

SUMMARY OF THE INVENTION

The Applicant Company has developed a novel item of equipment, more specifically a centre for the preparation of additives for hydraulic fracturing operations, which makes it possible to solve the issues described above.

More specifically, the invention makes it possible to combine together a number of the additives of a fracturing composition in a preparation centre compatible with the local transportation regulations.

The aim of this invention is to make possible the metering of several additives from a common centre with common transportation in order to observe road transfer conditions.

A subject-matter of the invention is thus a compact and transportable preparation centre, of the lorry trailer or container type, which can be used for fracturing operations on gas or oil fields, capable of metering out and dissolving two different polymers in the powder form, the said preparation centre comprising:

two pneumatic means respectively supplying two storage hoppers for two separate polymers, each pneumatic means being intended to be connected to a separate road tanker, two means for supplying and metering the polymer originating respectively from the two storage hoppers to a device for dispersing by grinding;

a device for dispersing and grinding the polymer, also referred to as a PSU (polymer slicing unit) comprising:
a cone for wetting the powder polymer connected to a primary water inlet circuit,
at the lower end of the cone:
a dispersed polymer grinding and drainage chamber comprising:
a motor-driven rotor equipped with blades,
a fixed stator constituted of a cylinder equipped with thin slots,
over all or part of the periphery of the chamber, a ring supplied by a secondary water circuit, the ring communicating with the chamber so as to ensure the spraying of pressurized water over the outside of the stator thus enabling the release of the ground and swollen polymer at the surface of said stator, two series of tanks for hydration and dissolution of the polymers connected to the dispersing and grinding device via independent pipelines, the said tanks being equipped with a stirring system;

two positive displacement vacuum pumps for metering the two solutions each originating from the two series of hydration and dissolution tanks and intended to supply, either via independent pipes or via a single pipe, a mixer itself connected to a high-pressure injection pump.

In a specific embodiment, each storage hopper is provided with pneumatic declogging filters for the pneumatic transportation of the polymer According to another characteristic of the invention, the centre also comprises a control room comprising the various means for managing the streams of the plant and the power generators, as well as the ancillary devices for treatment of the utilities (electricity, water, and the like).

The polymers in the powder form are polymers used in hydraulic fracturing operations. These are, for example, thickeners, for keeping the propping agents in suspension, and/or friction reducers. Mention may be made, from a non-limiting list, of acrylamide-based polymers, such as weakly anionic or nonionic copolymers comprising from 0 to 10 mol % of acrylic acid or having a low content of sulphonated monomer (ATBS, acrylamido tertiary butyl sulphonate), acrylamide/tri-methylaminoethyl acrylate chloride (90/10 mol %) copolymers, DADMAC (diallyldimethylammonium chloride) polymers, NVP (N-vinylpyrrolidone) polymers, guar gums, xanthan gums or modified celluloses.

According to an essential characteristic, the preparation centre of the invention is capable of metering and dissolving two polymers only during one and the same operation.

Preferably, the two polymers will be an acrylamide-based polymer and a guar gum.

More specifically, the trailer or the container is of standard size and can carry, by net weight, from 20 to 24 tonnes. The trailer or the container preferably has a size of 2 m 40 by 12 meters by 2.7 meters in height, excluding the chassis, and a weight of 20 to 22 tonnes in movement, to satisfy local requirements.

According to another characteristic, the two means for supplying and metering the polymers to the dispersing and grinding device each successively comprise:
- a horizontal screw which is situated at the bottom of the dihedron constituting the bottom of the storage hopper and which allows the polymer to be moved;
- a vertical screw supplying an intermediate hopper;
- a hopper supplying a metering screw;
- a metering screw.

The metering screws have a flow rate of from 120 up to 2000 kg/h and are adjusted to the necessary flow rates at the request of the fracturing company.

The control room can comprise electrical safeguards, a programmable controller and various instrumentations which make possible the continuous operation of the system. Furthermore, the centre can be autonomous with a power supply, a compressor, a water pump and telemetry or remote monitoring equipment.

The fluid compositions used for the hydraulic fracturing operations comprise, in addition to the polymers acting as friction reducers and viscosifying agents, other additives including crosslinking agents, delayed-effect crosslinking agents, surfactants, demulsifiers, scale inhibitors, corrosion inhibitors, bactericides or delayed-effect oxidants.

Under these conditions and in a specific embodiment, the preparation centre according to the invention additionally comprises:
- at least one additional storage tank for additives as mentioned above;
- at least one additional means for pumping and metering these additives, either into the device for dispersing and grinding the polymer, via the primary or secondary water admission system, or into the mixer, whether directly or whether via one and/or other of the independent or single pipes resulting from the positive displacement vacuum pumps for metering the solutions originating from the two series of hydration and dissolution tanks.

This makes it possible to position, in the preparation centre, one or more of the other additives of the fracturing composition and to meter them in the case where they are compatible.

Preferably, it is the crosslinking agent and in particular the borate which will be stored and metered in the preparation centre.

The PSU will be the heart of the system for dissolving, metering and injecting various ingredients into the mixer located before the high-pressure pump.

In the abovementioned documents of the Applicant, which related to the dissolution of polyacrylamide, a PSU 300 having a dispersing capacity of 300 kg/hour in 30 m$^3$ of water was sufficient for practically all the fracturing operations.

However, the amount of guar to be injected can routinely reach 500-800 kg/h, which necessitates the use of a PSU 600 capable of dispersing, on average, 600 kg/h of polymer with a maximum possibility of 800-1000 kg/h in a water flow rate of 50 to 60 m$^3$/h. By means of modifications to rates and shape, the powder flow rates can be brought to 2000 kg/h.

According to the invention, the centre comprises two series of hydration and dissolution tanks. Each series advantageously comprises two successive tanks.

Another subject-matter of the invention is a process for the hydraulic fracturing of gas or oil wells by injection of a fracturing fluid into the said well, comprising the following stages:
- two separate polymers are dissolved and metered out in the preparation centre described above,
- the resulting two solutions of polymer(s) are introduced into a mixer,
- one or more constituent ingredients of the fracturing fluid is/are introduced into the mixer,
- the fracturing fluid is injected into the well via a high-pressure injection pump.

The two polymer solutions can be introduced separately into the mixer, sequentially or simultaneously. They can also be combined before they are introduced into the mixer.

The polymers are advantageously chosen from the abovementioned list. They are preferably an acrylamide-based polymer and a guar gum.

The use of the equipment according to the invention in the process according to the invention makes it possible to easily and efficiently employ two polymers in the powder form with the aim of reducing the fracturing injection pressure by limiting the friction of the fluid in the injection pipes and/or of suspending the sand in the injection fluid.

The process according to the invention can additionally comprise a supplementary stage which is the metering into the mixer of at least one additive originating from the preparation centre which is the subject-matter of the invention.

According to the process of the invention, at least one constituent propping agent of the fracturing fluid is introduced directly into the mixer.

The propping agents commonly used are, for example, sands or ceramics. They are not prepared in the preparation centre according to the invention but are directly injected into the mixer.

In an advantageous embodiment, the process according to the invention is characterized in that the acrylamide-based polymers in the powder form used have a particle size of 0 to 500 µm, preferably of 0 to 400 µm, whatever the ionicity of the polymers, and preferably of 0 to 300 µm for nonionic polymers. This makes it possible to increase the grinding flow rate of the PSU at an unvarying power.

According to an advantageous embodiment, the process according to the invention is characterized in that the total residence time of the acrylamide-based polymer in the hydration tanks is between 20 and 30 minutes and that of the guar gum is from 1 to 10 minutes. However, the dissolution time can be greatly reduced by supplying the polyacrylamide as fine powder, reducing the powers necessary.

In another embodiment of the process according to the invention, the polymer solutions prepared are metered simultaneously into the mixer, in particular for some intermediate operations. This operation makes it possible to use the synergistic effect of the guar gum and the polyacrylamide with regard to the viscosity. More specifically, a portion of the polyacrylamide solution is used in order to mix it with the guar gum solution in order to use the synergistic effect of increasing the viscosity and to reduce the consumption of guar gum.

Optionally, the fracturing fluid composition additives, such as, for example, crosslinking agents, delayed-effect crosslinking agents, surfactants, demulsifiers, scale inhibitors, corrosion inhibitors, bactericides or delayed-effect oxidants, can be metered either into the device for dispersing and grinding the polymer, via the primary or secondary water inlet system, or into the mixer, whether directly or whether via one and/or other of the independent pipes or the common pipe resulting from the positive displacement vacuum pumps for metering the solutions originating from the two series of hydration and dissolution tanks.

Several technical solutions can be envisaged. The metering pumps can be connected to the mixer via two independent pipes. In another embodiment, the centre supplies the mixer via a single pipe connecting each of the pipes originating from the metering pumps. In this case, the single pipe can be supplied either with the mixture of the two polymer solutions or, with regard to an alternate mode, with one or other of the polymer solutions.

The invention and the advantages which result therefrom will emerge more clearly from the following implementational example with the support of the appended figures.

DETAILED DESCRIPTION OF THE INVENTION

Figure 1:
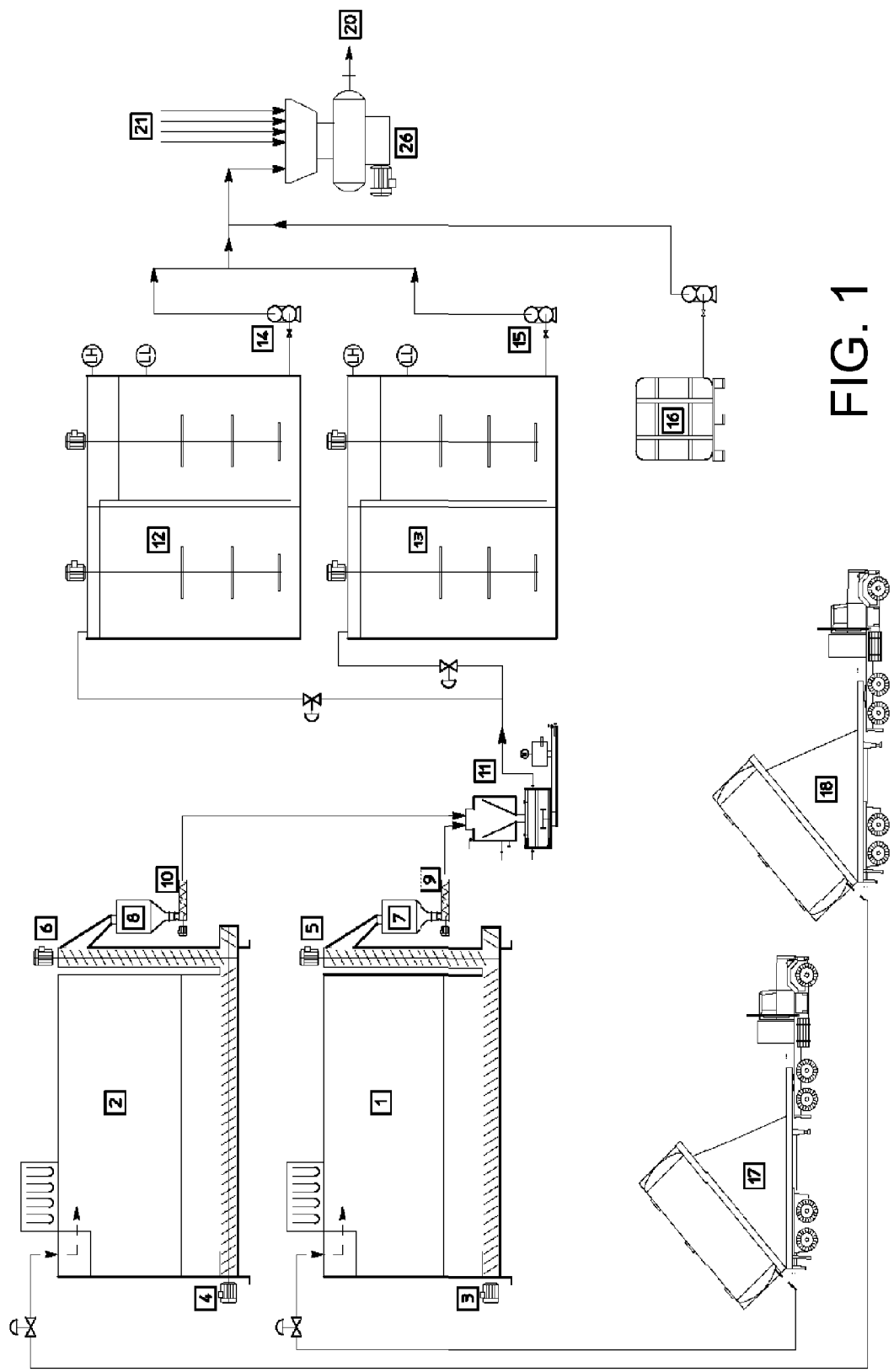
FIG. 1 is a diagrammatic side view of the streams in the preparation centre according to an advantageous embodiment of the invention.
Figure 2:
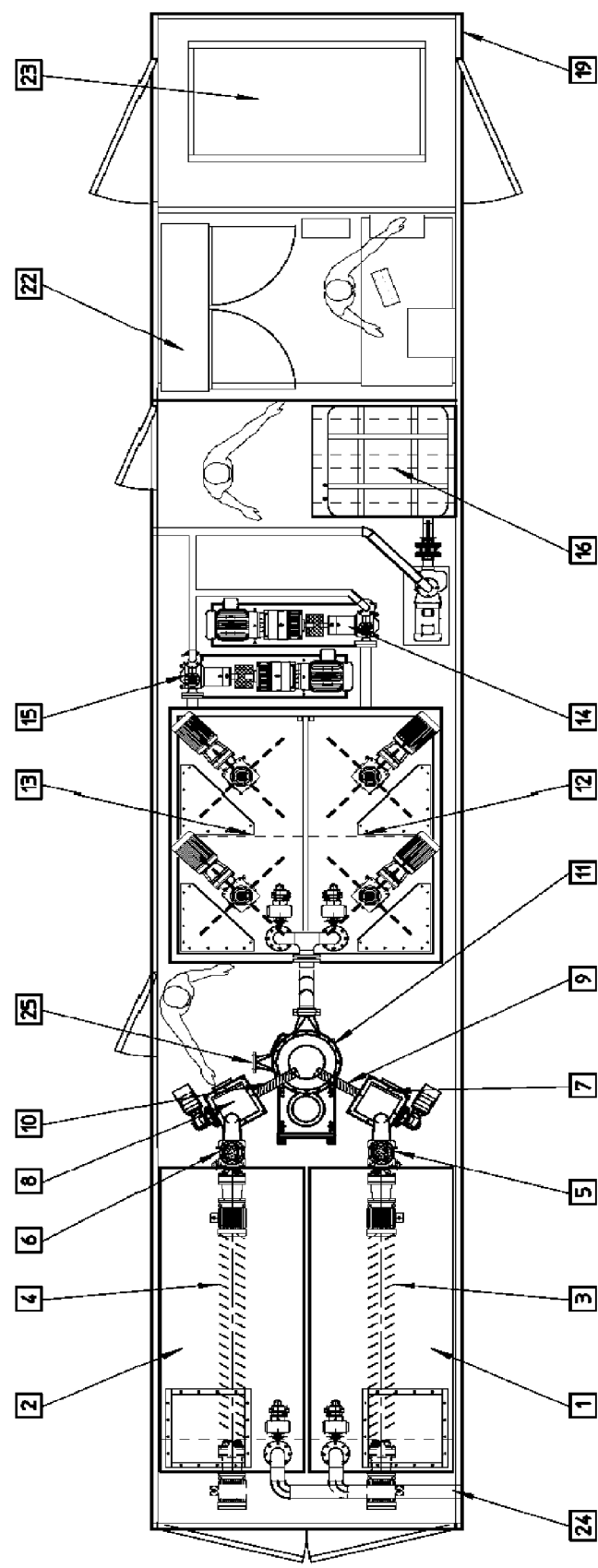
FIG. 2 is another diagrammatic view over the preparation centre according to an advantageous embodiment of the invention.

The basis of this centre is composed of:

A trailer (19) of standard size which can carry, by net weight, from 20 to 24 tonnes.

Two parallelepipedal hoppers (1, 2) with a dihedral bottom comprising a screw (3, 4) for the forward progression of the product. These hoppers are supplied by two road tankers (17, 18) for pulverulent products of approximately 20 tonnes provided with pneumatic transportation with automatic feeding.

They are equipped with a pneumatic declogging filter. Each tanker and each hopper is specific for the acrylamide-based polymer or the guar gum.

Each hopper (1, 2) supplies, via a vertical screw (5, 6) or pneumatic transportation, two hoppers (7, 8) dedicated to the acrylamide-based polymer and to the guar gum.

Under each hopper, a metering screw (9, 10), with a flow rate of 600 kg/hour for the acrylamide-based polymer and 2000 kg/hour for the guar gum, meter out these ingredients.

These metering screws alternately supply either with first polymer or with second polymer, a wetting cone located above the PSU 600 (11). Water will be supplied via a flow regulator which can control a supply of up to 20 m$^3$. The wetting cone will be coated with Teflon to prevent sticking to the walls in the case where the trailer would be on unstable ground.

The PSU 600 (11) makes possible the dispersing of one or other powder in the water (25) and is supplied with primary flow at 20 m$^3$/h at most. The secondary water will have a maximum flow rate of the order of 40 m$^3$/h, adjustable. Adaptation can be carried out on a case-by-case basis.

A combination of two vigorously stirred dissolution tanks (12) in series, with a total volume of approximately 3 m$^3$, will receive the guar gum suspension with a high and low level system on the 2$^{nd}$ tank.

A combination of two vigorously stirred dissolution tanks (13) in series, with a total volume of approximately 6 m$^3$, will receive the acrylamide-based polymer suspension. The particle size of the acrylamide-based polymer will be adapted to the possible dissolution time and will be of the order of 300 to 500 microns.

Two metering pumps (14 and 15) with a maximum flow rate of 60 m$^3$/h are directed by the central control room in order to inject the acrylamide-based polymer and the guar gum at the necessary flow rates into the mixer (26) supplying the high-pressure fracturing piston pump (20).

A 1000 liter container of sodium borate (16) with a metering pump will be prepositioned on the trailer so as to be able to inject, into the guar gum solution, the crosslinking agent necessary to keep the injected sand (propping agent) in suspension.

Various other pumps can be installed on this trailer, supplied by containers transported on a separate trailer.

Two pressurized powder road tankers (17, 18) comprising the polyacrylamide and the guar gum will be positioned close to this preparation centre, the opening or the closing of the supply valve situated on the receiving hoppers (24) making possible the sequential supplying of the two hoppers by high and low level measurements.

Ancillary systems: control boxes (22), electrical generator (23), compressor, water pressurization, and the like, make possible the continuous operation of the system.

The propping agent (21) will be introduced directly into the mixer (26).

This combination greatly simplifies the deploying and the metering of ingredients and makes it possible to move the combinations without intermediate emptying.

Furthermore, it eliminates the suspending of the guar gum, which increases the number of ingredients and their treatment in the water backflows at the end of the operation.

A person skilled in the art can vary the various parameters in order to adapt them to the specific conditions while retaining the desired aim. In particular, he can use a PSU of different size according to the requirements of the site.

What is claimed is:

1. A compact and transportable preparation center adapted to be used for fracturing operations on gas or oil fields, capable of metering out and dissolving two different polymers in powder form, the said preparation center comprising:

two pneumatic means respectively supplying two storage hoppers for two separate polymers, each pneumatic means being adapted to be connected to a separate road tanker, two means for supplying and metering the polymer originating respectively from the two storage hoppers to a device for dispersing by grinding, the device for dispersing and grinding the polymer comprising:
- a cone for wetting the powder polymer connected to a primary water inlet circuit,
- at a lower end of the cone:
  - a dispersed polymer grinding and drainage chamber comprising:
    - a motor-driven rotor equipped with blades,
    - a fixed stator constituted of a cylinder equipped with thin slots,
    - over all or part of a periphery of the chamber, a ring supplied by a secondary water circuit, the ring communicating with the chamber so as to ensure spraying of pressurized water over an outside of the stator, thus enabling release of ground and swollen polymer at a surface of said stator, two series of tanks for hydration and dissolution of the polymers connected to the dispersing and grinding device via independent pipelines, said tanks being equipped with a stirring system;

two positive displacement vacuum pumps for metering the two solutions, each originating from the two series of hydration and dissolution tanks and each adapted to supply, either via independent pipes or via a single pipe, a mixer itself connected to a high-pressure injection pump.

2. The preparation center according to claim 1, characterized in that each means for supplying and metering the polymers to the dispersing and grinding device successively comprises:
- a horizontal screw which is situated at the bottom of the dihedron constituting the bottom of the storage hopper and which allows the polymer to be moved;
- a vertical screw supplying an intermediate hopper;
- a hopper supplying a metering screw;
- a metering screw.

3. The preparation center according to claim 1, characterized in that the trailer or the container has a size of 2 m 40 by 12 meters by 2.7 meters in height, excluding the chassis, and a weight of 20 to 22 tonnes.

4. The preparation center according to claim 1, characterized in that it additionally comprises:
- at least one additional storage tank for additives;
- at least one additional means for pumping and metering these additives, either into the device for dispersing and grinding the polymer, via the primary or secondary water admission system, or into the mixer, whether directly or whether via one and/or other of the independent pipes or the common pipe resulting from the positive displacement vacuum pumps for metering the solutions originating from the two series of hydration and dissolution tanks.

5. The preparation center according to claim 1, characterized in that each series of dissolution tanks successively comprises two tanks.

* * * * *